(12) United States Patent
Hatakeyama

(10) Patent No.: US 7,788,467 B2
(45) Date of Patent: Aug. 31, 2010

(54) METHODS AND APPARATUS FOR LATENCY CONTROL IN A MULTIPROCESSOR SYSTEM

(75) Inventor: Akiyuki Hatakeyama, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 475 days.

(21) Appl. No.: 11/746,408

(22) Filed: May 9, 2007

(65) Prior Publication Data

US 2008/0282063 A1 Nov. 13, 2008

(51) Int. Cl.
  *G06F 5/06* (2006.01)
(52) U.S. Cl. ...................................... 712/11
(58) Field of Classification Search .............. None
  See application file for complete search history.

(56) References Cited

U.S. PATENT DOCUMENTS

| | | | | |
|---|---|---|---|---|
| 4,797,882 A | * | 1/1989 | Maxemchuk | 370/406 |
| 6,526,491 B2 | | 2/2003 | Suzuoki et al. | |
| 7,154,324 B1 | * | 12/2006 | Maangat et al. | 327/288 |
| 7,379,418 B2 | * | 5/2008 | Korb et al. | 370/216 |

* cited by examiner

*Primary Examiner*—Eddie P Chan
*Assistant Examiner*—Robert Fennema
(74) *Attorney, Agent, or Firm*—Matthew B. Dernier, Esq.; Gibson & Dernier LLP

(57) ABSTRACT

Methods and apparatus provide for a multiprocessor system including: a plurality of sub-processors operatively coupled to one another over a ring bus, whereby data may be transmitted over one or more paths on the ring bus between pairs of the sub-processors; and a plurality of programmable delay circuits, each associated with at least one of the sub-processors, and each being operable to alter a delay of data transfer at least one of into and out of its associated sub-processor in order to alter one or more latencies associated with the paths on the ring bus between pairs of the sub-processors.

18 Claims, 12 Drawing Sheets

PROCESSOR

|   | 0 | 1 | 2 |     |
|---|---|---|---|-----|
| 0 | 0 | 1 | 2 | CW  |
|   | 0 | 3 | 2 | CCW |
| 1 | 3 | 0 | 1 | CW  |
|   | 1 | 0 | 3 | CCW |
| 2 | 2 | 3 | 0 | CW  |
|   | 2 | 1 | 0 | CCW |

(Legend)

| 102A | 102B |
|------|------|
| x    | 0    |
| 2    | 1    |
| 102D | 102C |

FIG. 4

PROCESSOR

|   | 0 | 1 | 2 |     |
|---|---|---|---|-----|
| 0 | 0 | 2 | 3 | CW  |
|   | 0 | 2 | 1 | CCW |
| 1 | 2 | 0 | 1 | CW  |
|   | 2 | 0 | 3 | CCW |
| 2 | 1 | 3 | 0 | CW  |
|   | 3 | 1 | 0 | CCW |

(Legend)

| 102A | 102B |
|------|------|
| 0    | x    |
| 2    | 1    |
| 102D | 102C |

FIG. 5

PROCESSOR

|   | 0 | 1 | 2 |     |
|---|---|---|---|-----|
| 0 | 0 | 1 | 3 | cw  |
|   | 0 | 3 | 1 | ccw |
| 1 | 3 | 0 | 2 | cw  |
|   | 1 | 0 | 2 | ccw |
| 2 | 1 | 2 | 0 | cw  |
|   | 3 | 2 | 0 | ccw |

PROCESSOR (Legend)

| 102A | 102B |
|------|------|
| 0    | 1    |
| 2    | x    |
| 102D | 102C |

FIG. 6

PROCESSOR

|   | 0 | 1 | 2 |     |
|---|---|---|---|-----|
| 0 | 0 | 1 | 2 | cw  |
|   | 0 | 3 | 2 | ccw |
| 1 | 3 | 0 | 1 | cw  |
|   | 1 | 0 | 3 | ccw |
| 2 | 2 | 3 | 0 | cw  |
|   | 2 | 1 | 0 | ccw |

PROCESSOR (Legend)

| 102A | 102B |
|------|------|
| 0    | 1    |
| x    | 2    |
| 102D | 102C |

FIG. 11

PROCESSOR

|   | 0 | 1 | 2 | |
|---|---|---|---|---|
| 0 | 0 | 2 | 3 | CW |
|   | 0 | 3 | 2 | CCW |
| 1 | 3 | 0 | 2 | CW |
|   | 2 | 0 | 3 | CCW |
| 2 | 2 | 3 | 0 | CW |
|   | 3 | 2 | 0 | CCW |

PROCESSOR

METHODS AND APPARATUS FOR LATENCY CONTROL IN A MULTIPROCESSOR SYSTEM

BACKGROUND

The present invention relates to methods and apparatus for managing the effects of a changing latency in the transfer of data between the processors of a multiprocessing system within an integrated circuit.

There continues to be a desire for faster computer processing data throughputs as computer applications involve higher complexity computations, e.g., for real-time, multimedia functionality. Graphics applications are among those that place the highest demands on a processing system because they require such vast numbers of data accesses, data computations, and data manipulations in relatively short periods of time to achieve desirable visual results. These applications require extremely fast processing speeds, such as many thousands of megabits of data per second. While some processing systems employ a single processor to achieve fast processing speeds, others are implemented utilizing multi-processor architectures. In multi-processor systems, a plurality of sub-processors can operate in parallel (or at least in concert) to achieve desired processing results.

Large scale integrated circuits are being designed to accommodate an ever increasing number of circuits in order to achieve higher and higher functionality. For example, the digital circuits (or analog circuits) associated with fabricating multiprocessor system are being designed with very high numbers of gates and other functional circuitry to meet processing objectives in the marketplace. As the complexity of integrated circuits (ICs) continue to increase, however, the number of transistors and other components used to implement the circuitry also increases and the probability of a faulty component or circuit occurring in an IC approaches one. The existence of a faulty circuit or component may require that the IC be discarded.

It has been proposed to use redundant circuits on the IC in order to permit replacement of the circuitry containing a faulty component. For example, FIG. 1 illustrates an IC 10 employing digital circuit A, digital circuit B, digital circuit C, and digital circuit D, where one or more of the circuits may be redundant. Thus, even when a fault occurs, the IC 10 may be salvaged by enabling the redundant circuit. This can increase the IC yield and save the IC manufacturer a considerable amount of money. While the redundant circuit(s) may be activated and used in place of the faulty components, the faulty component may be deactivated. Conventional techniques for activating good circuits and deactivating faulty circuits include blowing fuses, such as electrical fuses (e-fuses) and/or laser-trimmed fuses.

The components or circuits of an IC may be faulty due to improper fabrication. For example, an imperfection may have been present on the substrate during fabrication or the fabrication procedure itself may be faulty. Improperly fabricated ICs may be discovered during IC testing, prior to packaging. ICs may also be damaged after the pre-packaging IC testing. The components or circuits of an IC may be faulty due to damage during the packaging of the IC, for example, when the die is cut from the wafer, when the wafer is cleaned, when the die is bonded to the packaging, and so forth. ICs that become faulty due to packaging are usually not discovered until post-packaging testing. If a faulty component is discovered on an IC during pre-packaging IC testing, the faulty component may be deactivated and a redundant circuit activated to take its place through the blowing of certain fuses, preferably, laser fuses since access to the IC is possible because the IC has yet to be packaged. If a faulty component is discovered on an IC after packaging, additional redundant circuits can be activated through the use of electrical fuses (e-fuses), rather than laser fuses, since direct access to the IC is not possible.

Another existing technique for addressing the defective circuit problem may be described in the context of the aforementioned multiprocessor system context, in which a plurality of sub-processors exchange data and operate in parallel to achieve one or more computing goals. By way of example, a multiprocessor system manufacturer may determine that a system in which three sub-processors are operational is desirable and marketable. The manufacturer may establish the fabrication process such that four sub-processors are fabricated on one IC. Thus, even if one sub-processor is defective, three good sub-processors will remain and the IC will not need to be discarded. This approach will result in one of the following scenarios for a given IC: (1) four good sub-processors exist; (2) three good sub-processors exist; or (3) less than three good sub-processors exist. In scenario (3), the IC is discarded. In scenario (2) the defective sub-processor is fully disabled and unused. In scenario (1), one of the four good sub-processors is disabled. Thus, irrespective of which of scenarios (1) and (2) exists, the result is an IC with three working sub-processors—the number that the manufacturer desires and that the software programmer expects. Indeed, software programmers may design programs to operate in the multiprocessor system assuming that three sub-processors are present (no more, no less).

A problem arises, however, when one of the processors is disabled in that the latency pattern as between the available sub-processors is not predictable, which may result in undesirable timing problems. The latency pattern for a particular IC involves the latency of data transfers between respective pairs of sub-processors. The latency depends on the location of the sub-processors on the bus that interconnects them. By way of example, if the interconnecting bus is implemented using a one or more data rings, then the latency of data transfers between pairs of sub-processors will depend where the sub-processors are located along the data ring and in what direction (clockwise or counterclockwise) the data are flowing between them. If the relative locations of the sub-processors on respective ICs are constant, then the manufacturer can specify the latency pattern as between pairs of sub-processors to the software programmers so that they have a predictable latency pattern on which to base their programming. In the context of the defective sub-processor problem discussed above, however, the latency pattern as between respective pairs of sub-processors is not constant because the location of the defective sub-processor is unpredictable. This can result in undesirable timing problems when software is executed on the multiprocessor system.

Thus, another technique to permit disabling of circuitry on an IC (such as the sub-processors of a multiprocessing system) is needed that results in a predictable latency pattern.

SUMMARY OF THE INVENTION

It is noted that some ICs are designed with a plurality of circuits that are intended more for parallel functionality as opposed to redundancy. For example, in a parallel processing system, a number of processing circuits may be disposed in an IC, where each of the processors may operate in series or parallel to achieve a processing objective. While the processors may be redundant in the sense that they can perform the same functions, they are primarily provided for operation in parallel (and/or series) to increase processing performance.

By way of example, a multiprocessing system may have a potential of three, four, eight etc., valid sub-processing units (SPUs processors) in a common IC. As discussed above, some of the SPUs may be faulty and, therefore, the overall performance of the IC may be reduced. Instead of enabling a redundant SPU to replace the faulty SPU, one or more embodiments of the invention contemplate disabling the faulty SPU and using the reduced performance multiprocessing system in an application (e.g., a product) that does not require a full complement of SPUs. For example, a high performance video game product may require a full complement of SPUs; however, a digital television (DTV) might not require a full complement of SPUs. Depending on the complexity of the application in which the multiprocessing system is to be used, a lesser number of SPU processors may be employed by disabling the faulty SPU processors and using the resulting multiprocessing system in a less demanding environment (such as a DTV).

According to one or more embodiments of the invention, each sub-processor includes a programmable latency circuit that may be configured during the manufacturing process. By way of example, the programmable latency circuit may be implemented using a plurality of flip flops. A greater or lesser number of the flip flops may be made operational to increase or decrease an amount of latency associated with transferring data into or out of a given sub-processor. Thus, if one of the sub-processors in the multiprocessor system is disabled, the programmable latency circuits associated with one or more of the other sub-processors are programmed to ensure that the delays in transferring data between the remaining sub-processors adheres to an expected latency pattern. Advantageously, this should eliminate timing problems when a software program is executed within the system irrespective of which of the sub-processors have been disabled.

In accordance with one or more embodiments of the present invention, methods and apparatus provide for: providing a plurality of sub-processors operatively coupled to one another over a ring bus, whereby data may be transmitted over one or more paths on the ring bus between pairs of the sub-processors; and altering a delay of data transfer at least one of into and out of one or more of the sub-processors in order to alter one or more latencies associated with the paths on the ring bus between pairs of the sub-processors.

Altering the delays may be such that a pattern of latencies between pairs of sub-processors is the same irrespective of a location of a disabled sub-processor. The delays of the delay circuits define a delay pattern. The delay pattern may be different depending on the location of the disabled sub-processor.

By way of example, the methods and apparatus in accordance with one or more embodiments may provide for: defining a first pattern of latencies between respective pairs of enabled sub-processors coupled together over a ring bus including latencies past at least one disabled sub-processor in a first position on the ring bus; defining a second pattern of latencies between respective pairs of enabled sub-processors coupled together over the ring bus including latencies past the at least one disabled sub-processor in a second position on the ring bus; defining at least one further pattern of latencies for at least one further location of the at least one disabled sub-processor; and determining a respective delay pattern for each of the patterns of latencies, whereby each delay pattern represents adding delays in data transfer at least one of into and out of one or more of the sub-processors such that the delay pattern facilitates an altered pattern of latencies between pairs of sub-processors and wherein the altered pattern of latencies is the same irrespective of the location of the at least one disabled sub-processor.

The steps of defining the patterns of latencies between respective pairs of enabled sub-processors may include aggregating latencies of respective path segments between adjacent sub-processors disposed between the respective pairs of sub-processors. The patterns of latencies may be defined in terms of in one or more clockwise directions and/or one or more counterclockwise directions about the ring bus.

The methods and apparatus in accordance with one or more embodiments may further provide for: determining a maximum latency between a pair of sub-processors with N enabled sub-processors therebetween; comparing the maximum latency with the determined latencies between other pairs of sub-processors with N enabled sub-processors therebetween; and computing a portion of the delay pattern such that adding delays in data transfer at least one of into and out of at least some of the other pairs of sub-processors with N enabled sub-processors therebetween would result in latencies between such pairs of sub-processors substantially equal to the maximum latency. The comparing and computing steps may be repeated for an integer number of N, where N=0, 1, . . . M−1, and where M is a total number of enabled sub-processors.

Other aspects, features, advantages, etc. will become apparent to one skilled in the art when the description of the invention herein is taken in conjunction with the accompanying drawings.

BRIEF DESCRIPTION OF THE DRAWINGS

For the purposes of illustrating the various aspects of the invention, there are shown in the drawings forms that are presently preferred, it being understood, however, that the invention is not limited to the precise arrangements and instrumentalities shown.

FIGS. 3-6 are graphical representations of latency patterns for the multiprocessor system of FIG. 2 with no correction delays and with varying the position of a defective sub-processor;

FIG. 11 is a common latency pattern to which the multiprocessor system of FIG. 2 will adhere when the delay patterns of FIGS. 7-10 are applied as a function of the position of the defective processor;

DETAILED DESCRIPTION OF THE PRESENT INVENTION

Figure 1:
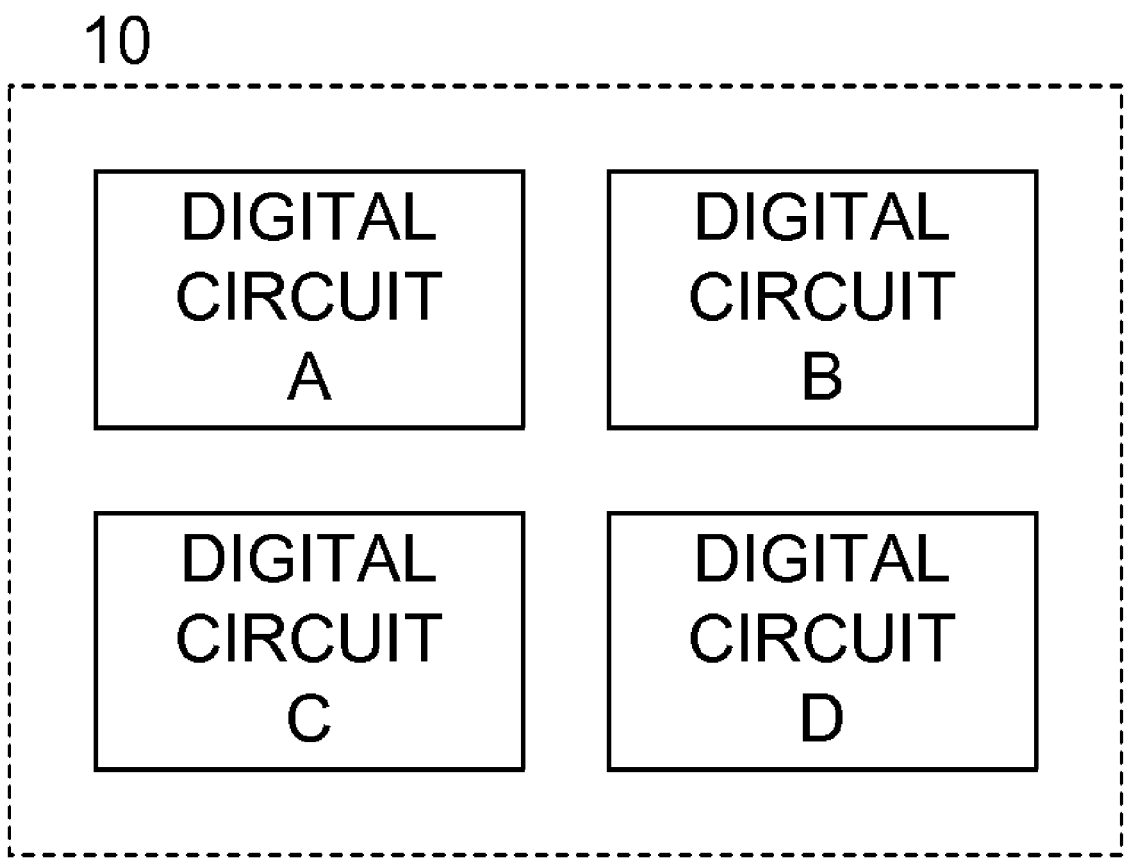
FIG. 1 is a block diagram illustrating the structure of a system employing redundant circuitry in accordance with the prior art.
Figure 2:
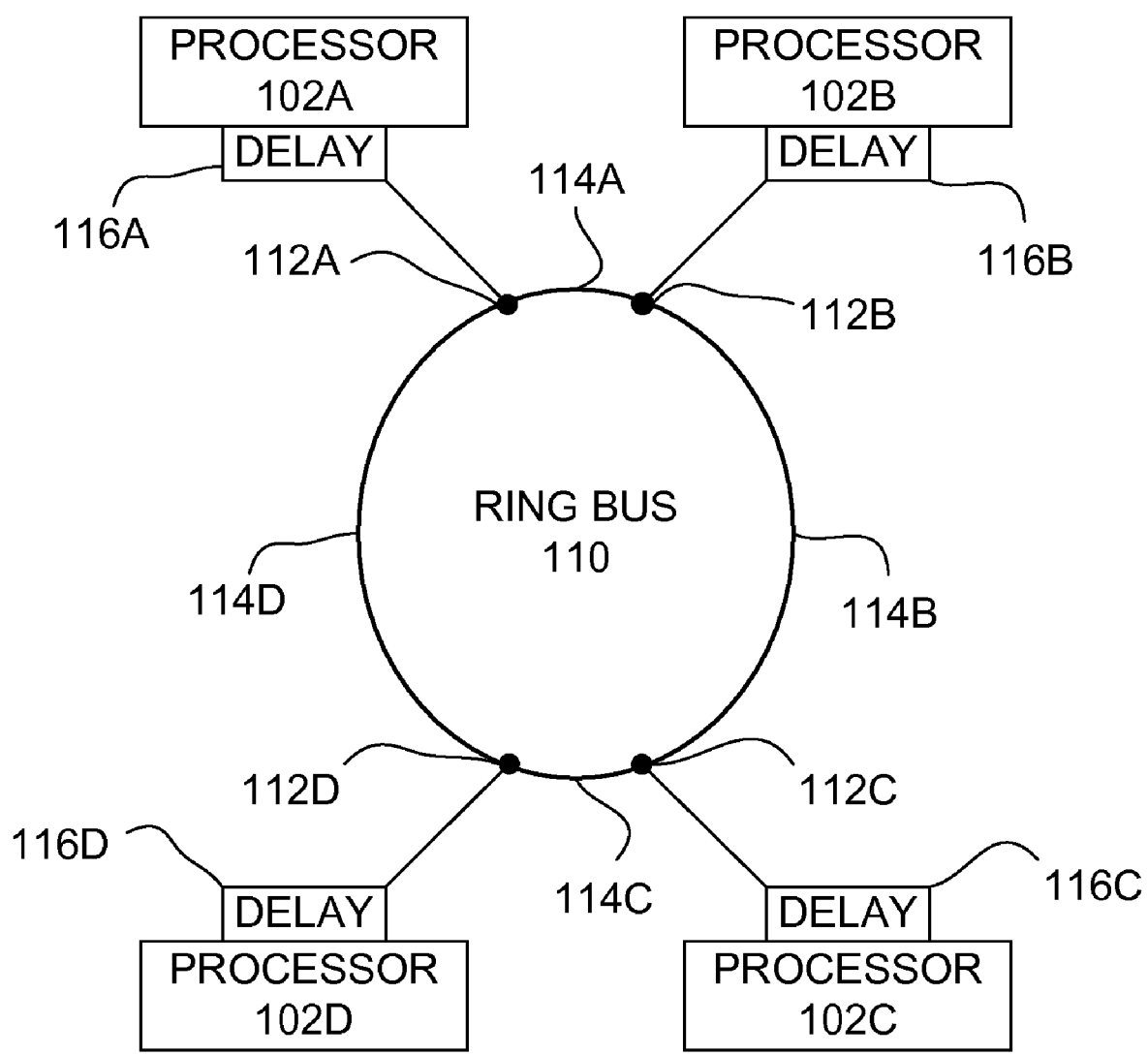
FIG. 2 is a block diagram illustrating a multiprocessor system in accordance with one or more embodiments of the present invention.

With reference to the drawings, wherein like numerals indicate like elements, there is shown in FIG. 2 a system 100 that may be adapted for carrying out one or more features of the present invention. For the purposes of brevity and clarity, the block diagram of FIG. 2 will be referred to and described herein as illustrating an apparatus 100, it being understood, however, that the description may readily be applied to various aspects of a method with equal force.

The apparatus 100 preferably includes a plurality of circuit blocks, which in a preferred embodiment may be a plurality of sub-processors 102A-D. The sub-processors 102A-D may be integrated within a single IC or may be separately provided. The system also includes a ring bus 110, whereby data may be transmitted over one or more paths on the ring bus 110 between pairs of the sub-processors 102. By way of example, the ring bus 110 may be implemented using a one or more data rings, such as four data rings, which connect all the sub-processors 102 together. In one or more embodiments, the data rings can be in the same or different directions, such as two rings running clockwise and two rings running counterclockwise. A plurality of on/off ramps 112A-D are provided, such as one per sub-processor 102, in order to permit data traffic to enter and exit the ring bus 110. The on/off ramps 112A-D define respective path segments 114A-D of the ring bus 110 between each pair of sub-processors 102. The system 100 also includes a plurality of programmable delay circuits 116A-D, each associated with at least one of the sub-processors 102A-D. Each of the delay circuits 116A-D may be operable to alter a delay of data transfer into and/or out of its associated sub-processor. As will be discussed in more detail below, the respective delays introduced by the delay circuits 116 may be employed to alter, and make substantially consistent, one or more latencies associated with the paths on the ring bus between pairs of the sub-processors 102.

It is understood that any number of sub-processors 102 may be employed without departing from the spirit and scope of the one or more embodiments of the invention.

In a preferred embodiment the sub-processors 102 may be implemented utilizing any of the known technologies that are capable of requesting data from a system memory (not shown), and manipulating the data to achieve a desirable result. For example, the sub-processors 102 may be implemented using any of the known microprocessors that are capable of executing software and/or firmware, including standard microprocessors, distributed microprocessors, etc. By way of example, the sub-processors 102 may be graphics processors that are capable of requesting and manipulating data, such as pixel data, including gray scale information, color information, texture data, polygonal information, video frame information, etc.

In order to more fully understand the structure and operation of the system 100, a discussion of the flow of data between respective sub-processors 102 will be discussed with reference to FIGS. 3-6 and with the understanding that the delay circuits 116 are initially assumed not to present or not to introduce delays in the data transmission paths. FIGS. 3-6 are graphical representations or tables of latency patterns for the multi-processor system 100, wherein no correction delays have been introduced by the delay circuit 116. The respective axes of the tables represent particular processors 102 about the ring bus 110. For purposes of discussion, the processors of the table have been labeled 0, 1, 2.

With particular reference to FIG. 3, the legend shows that processor 0 represents sub-processor 102B, processor 1 represents sub-processor 102C, and processor 2 represents sub-processor 102D. Notably, sub-processor 102A is represented by the legend "X", which indicates that processor 102A is assumed to be disabled. As discussed above, the disabling of sub-processor 102A may have resulted from a determination that the circuitry implementing sub-processor 102A was found to be faulty necessitating the disablement thereof. Alternatively, sub-processor 102A may have been fully functional, however, design considerations may have dictated that a total of three operational sub-processor 102 was desirable, thereby necessitating the disablement of one of the sub-processors 102.

The particular location of the disabled sub-processor 102A is of concern as the latencies of data transfer between respective pairs of enabled sub-processors 102 is affected by such location. In particular, the table includes numerical representations of the total latency between respective pairs of enabled sub-processors (including the latencies past the disabled sub-processor 102A). In the context of this example, it is assumed that the ring bus 110 provides data transfer in the clockwise (CW) and counterclockwise (CCW) directions. Not surprisingly, the total latencies in the table representing data transfers between the same sub-processor 102 (i.e., between processor 0-0, 1-1, and 2-2) are 0 irrespectively of the CW or CCW directions. Indeed, this graphically represents the fact that the data have not traversed the ring bus 110.

A data transfer, however, between processor 0 (sub-processor 102B) and processor 1 (sub-processor 102C) in the CW direction indicates a total latency of 1. With reference to FIG. 2, it is understood that the total latency of 1 represents the latency of data transferred from sub-processor 102B through the on/off ramp 112B, over the path segment 114B, and through the on/off ramp 112C to sub-processor 102C. By way of further illustration, the table of FIG. 3 shows a total latency of 2 for data transfers between processor 0 and processor 2 in the CW direction. With reference to FIG. 2, it is understood that the total latency of 2 represents the latencies associated with a transfer of data from processor 102B through on/off ramp 112B, across path segment 114B, through on/off ramp 112C, across path segment 114C, and through on/off ramp 112D to sub-processor 102D. While the above two examples illustrated the transfer of data between sub-processors 102 in which the disabled sub-processor 102A was not traversed. A transfer of data from processor 2 to processor 0 in the CW direction, however, would involve a traversal of the disabled sub-processor 102A. The table of FIG. 3 shows that such a data transfer results in a total latency of 2. Again, with reference to FIG. 2, the total latency of 2 illustrates the latencies associated with transferring data from the sub-processor 102D through on/off ramp 112D, over path segment 114D, through on/off ramp 112A, over path segment 114A, and through on/off ramp 112B to sub-processor 102B. Notably, from the point of view of a software programmer, the total latency as between processor 2 and processor 0 in the CW direction would represent the total latency as between immediately adjacent, enabled sub-processors 102. But for the disabled sub-processor 102A, such total latency would otherwise be 1.

Similar analyses with respect to determining total latencies between respective pairs of the sub-processor 102 (including the effects of the disabled sub-processor 102A) may be carried out by one skilled in the art in order to confirm the other latency entries in the table of FIG. 3 both in the CW direction and in the CCW direction.

It is noted that, for the purposes of brevity and clarity, the "total latency" discussed herein is primarily comprised of the latency over the path segments 114 of the ring bus 110. Those skilled in the art, however, will appreciate that more refined determinations may be made (if desired) by taking into account other delays through the system 100 (e.g., of sub-components not shown but considered inherent or obvious to those of skill in the art), which are all considered to be within the spirit and scope of the present invention.

Irrespectively of the particularities of exactly how the total latency is defined, the pattern of latencies presented in FIG. 3 is affected by the location of the disabled processor 102A. Indeed, with reference to FIG. 4, a different pattern of latencies arises when sub-processor 102B is disabled. So too for the patterns of latencies illustrated in FIGS. 5 and 6. Thus, in a general sense, the pattern of FIG. 3 may represent a first pattern of latencies between respective pairs of enabled sub-processors 102 (including latencies traversing at least one disabled sub-processor 102 in a first position on the ring bus 110). The pattern illustrated in FIG. 4 may represent a second pattern of latencies between enabled sub-processors, also including latencies past at least one disabled sub-processor 102 in a second position on the ring bus 110. The patterns illustrated in FIGS. 5 and 6 may represent third and fourth patterns, respectively, of latencies between respective pairs of enabled sub-processors 102.

The fact that the respective patterns of latencies are different as a function of the position of the disabled sub-processor 102 may be problematic to a software programmer. Indeed, from the software programmer's point of view, the latencies associated with the transfer of data between respective pairs of sub-processors 102 should be predictable irrespective of which system 100 is employed to execute the software. Unfortunately, the software programmer has no control over the position of the disabled sub-processor 102 about the ring bus 110. Thus, such predictability cannot be guaranteed without intervention. Further, it would be significantly inefficient for a software programmer to produce custom software for each system 100 being produced by a manufacturer or to otherwise try to account for the unpredictability by way of software.

In accordance with one or more embodiments of the present invention, the delay circuits 116 are operable to alter the delay of data transfer between respective pairs of the sub-processors 102 such that the altered patterns of latencies are substantially identical. In a preferred embodiment, the respective amounts of delays (if any) introduced by the respective delay circuits 116 are programmed during the manufacturing process as a function of the location of the disabled sub-processor(s) 102. As will be discussed in more detail hereinbelow, the specific delay introduced by the delay circuits 116 will change depending on the location of the disabled sub-processor(s) 102, the direction of data transfer over the ring bus 110, and the particular sub-processors 102 forming the pair between which data are transferred.

Again, the goal is to establish delays in the delay circuits 116 that will alter the respective patterns of latencies (illustrated by way of example in FIGS. 3-6) into a substantially predictable, common pattern of latencies upon which the software programmer may rely in producing a software program to be executed on the system 100.

In accordance with one or more embodiments of the present invention, one way in which the particular delays to be introduced by the delay circuits 116 may be determined will now be discussed. Reference is made to FIGS. 7-12. As an initial matter, it is assumed that the patters of latencies (e.g., shown in FIGS. 3-6) are determined (action 200, FIG. 12). Next, a substantially maximum latency may be determined for the system 100 that represents the latency between a pair of sub-processors with 0 enabled sub-processors (N=0) located therebetween (action 202, FIG. 12). In other words, with reference to the respective legends of FIGS. 3-6, the substantially maximum latency between any pair of immediately adjacent enabled sub-processor is 2. Indeed, this maximum latency is found when a data transfer between two enabled sub-processors requires traversing the disabled sub-processor—irrespective of the particular location of the disabled sub-processor 102 and/or the CW or CCW directions. This substantially maximum latency is 2.

Next, a portion of a delay pattern to be introduced by the delay circuits 116 is computed or determined (actions 204, 206) by comparing the substantially maximum latency with the latencies found in the respective tables of FIGS. 3-6. In this regard, one approach to such computation may involve reviewing the total latencies associated with data transfers between immediately adjacent enabled sub-processors 102 in both the CW and CCW directions and noting the following: (i) if the total latency=1, then delay=+1; and (ii) if total latency=2, then delay=0. With reference to FIGS. 7-10, the situations in which a computed delay of +1 have been established have been highlighted with a circle.

Next, a substantially maximum latency may be determined between one or more pairs of sub-processors in which one enabled sub-processor (N=1) is located therebetween. This substantially maximum latency is 3. Another portion of the delay pattern to be introduced by the delay circuits 116 is then computed or determined (actions 204, 206) by comparing the substantially maximum latency with the latencies found in the respective tables of FIGS. 3-6. In this regard, the total latencies associated with data transfers between pairs of enabled sub-processors 102 (and between which one enabled sub-processor 102 is disposed) are analyzed in both the CW and CCW directions. The following rules are applied: (i) if the total latency=2, then delay=+1; and (ii) if total latency=3, then delay=0. With reference to FIGS. 7-10, the situations in which a computed delay of +1 have been established for N=1 have been outlined with a square.

The above described approach of determining the substantially maximum latency between a pair of sub-processor may be continued in order to account for other numbers of intervening, enabled sub-processors (i.e., N=2, N=3, etc. all depending on the total number of enabled and disabled sub-processors).

Figure 7:
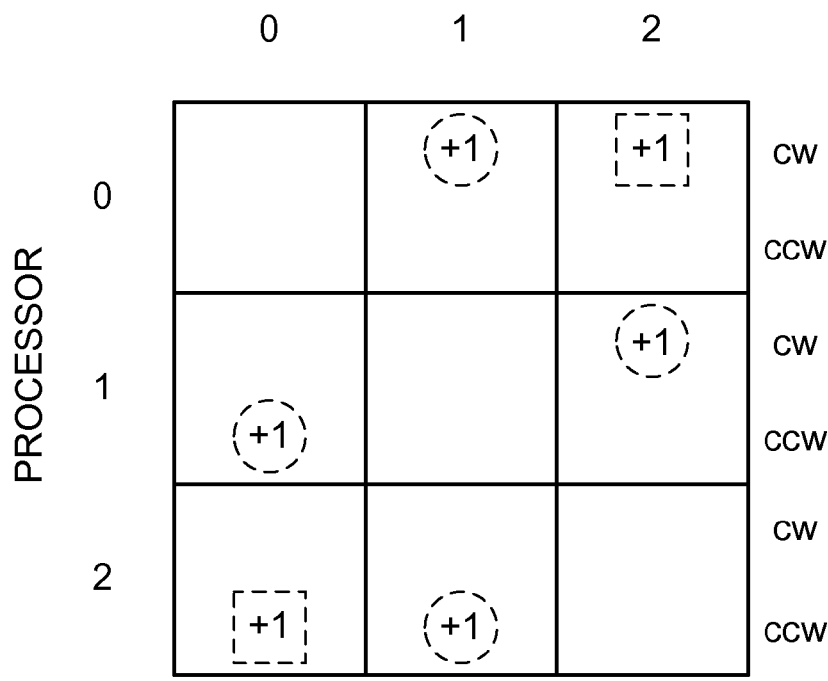
FIGS. 7-10 are graphical representations of delay patterns for the multiprocessor system of FIG. 2 such that the latency patterns of FIGS. 3-6 may be corrected and harmonized.
Figure 8:
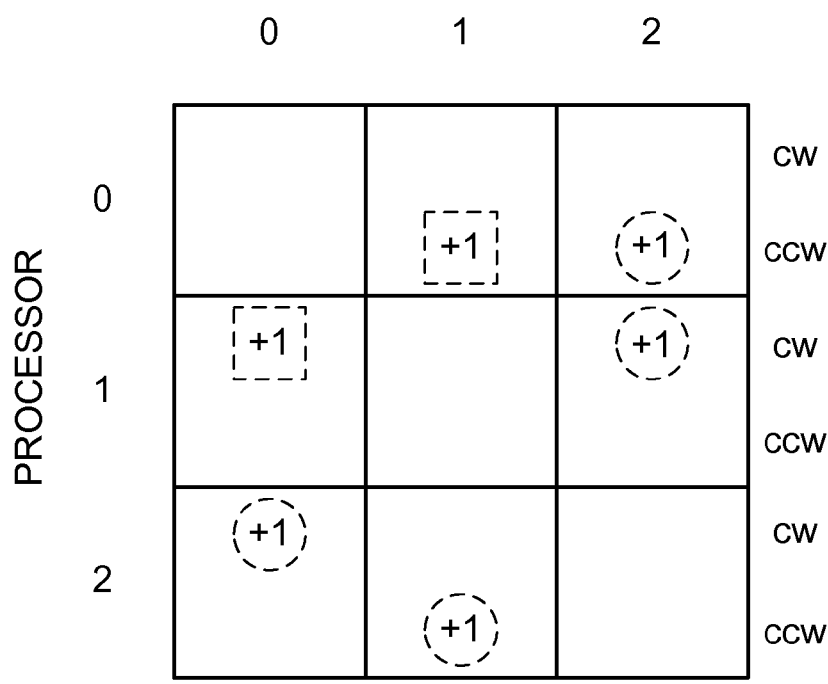
Figure 9:
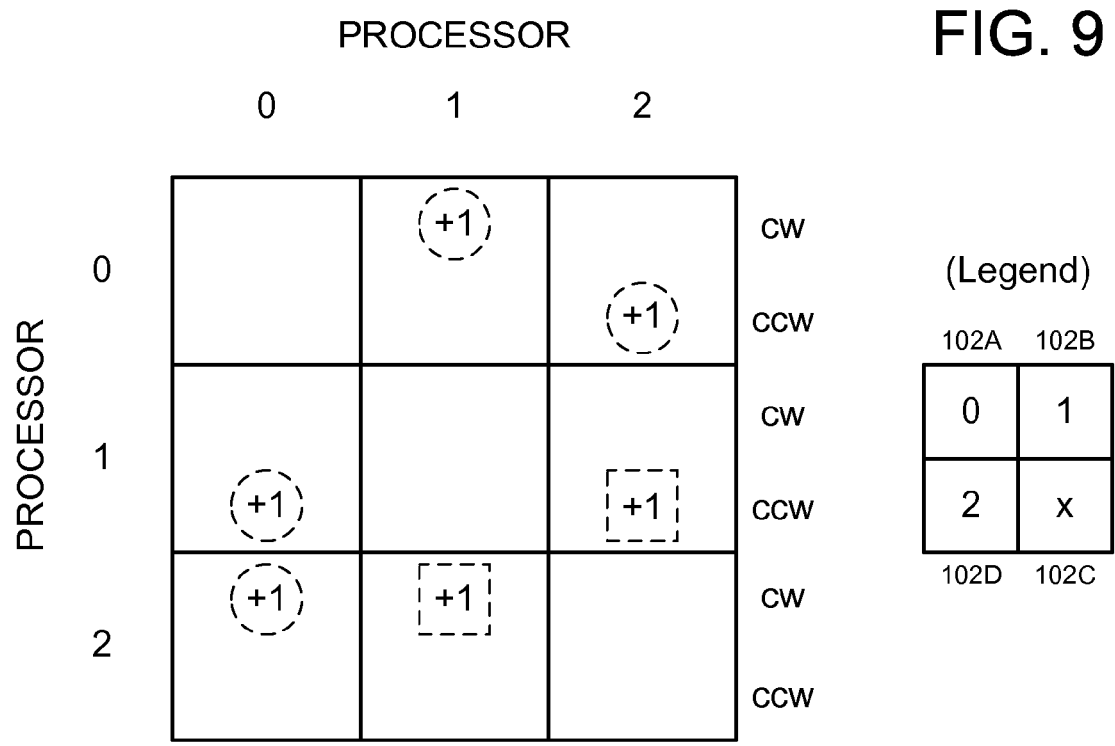
Figure 10:
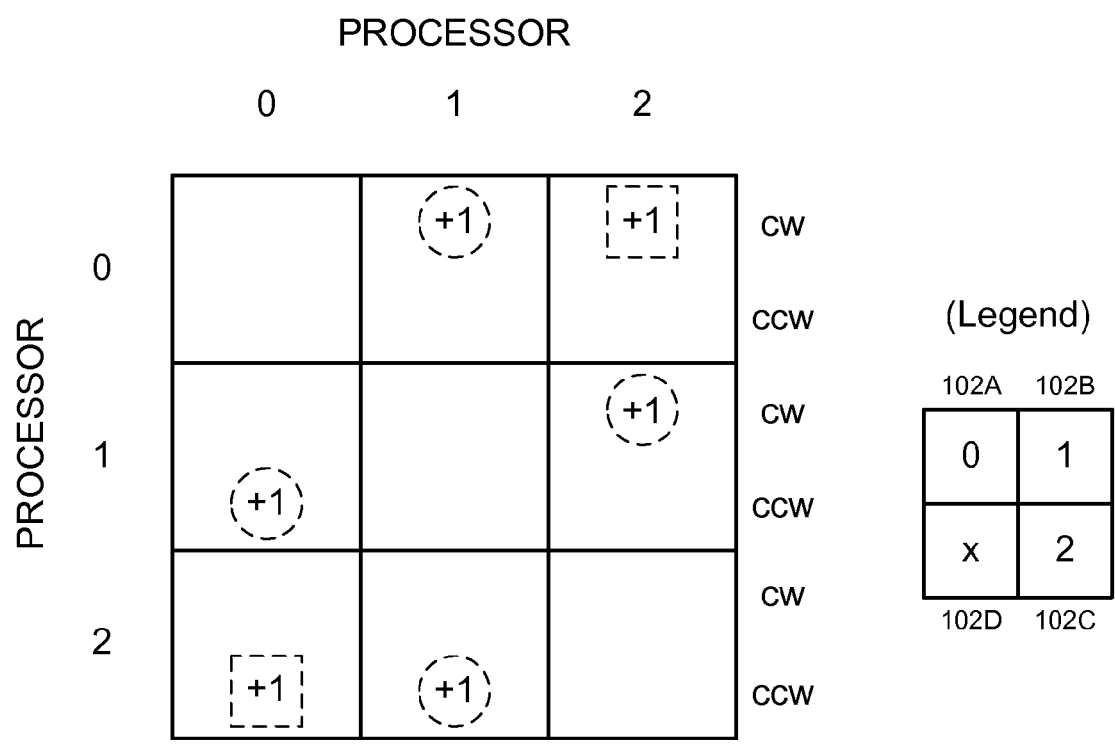
Figure 12:
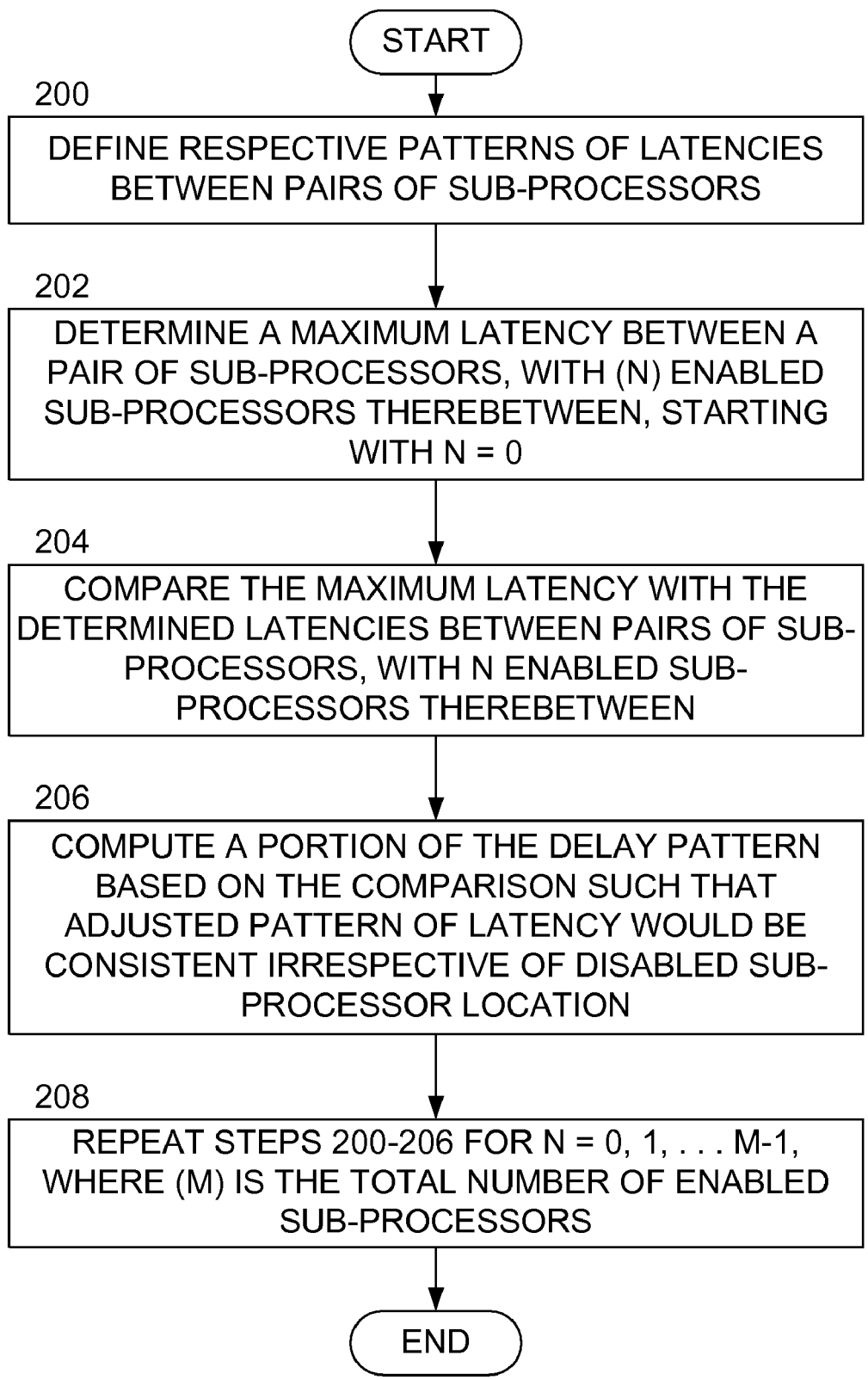
FIG. 12 is a flow diagram illustrating a process that may be carried out such that the multiprocessor system of FIG. 2 adheres to the common latency pattern of FIG. 11.

In accordance with one or more embodiments of the present invention, if a determination is made during the fabrication process to disable sub-processor 102A, then the delay circuits 116A-D may be programmed to exhibit the delay pattern shown in FIG. 7. When this is done, the altered pattern of latencies will be that illustrated in FIG. 11. On the other hand, if it is determined during the fabrication process, that processor 102B is to be disabled, then the delay circuits 116A are preferably programmed with the delay pattern illustrated in FIG. 8. Notably, when this done, the altered pattern of latencies is also that illustrated in FIG. 11. Still further, if it is determined during the fabrication process that sub-processor 102C is to be disabled, then the delay circuits 116A-D are preferably programmed with the delay pattern illustrated in FIG. 9. Again, when this is done, the altered pattern of latencies is also that illustrated in FIG. 11. Finally, if during the manufacturing process it is determined that the sub-processor 102D is to be disabled, then the delay circuit 116A-D are preferably programmed with the delay pattern illustrated in FIG. 10. Again, when this done, the resulting altered pattern of latencies is also that illustrated in FIG. 11.

Advantageously, the system 100 may be programmed (by way of the delay circuits 116A-D) to compensate for the unpredictable location of the disabled sub-processor 102, such that the resulting pattern of latencies of the system 100 will be predictable, such as is illustrated in FIG. 11. Consequently, a software programmer may rely on the pattern of latencies, e.g., as illustrated by way of example in FIG. 11, when producing a software program to be executed on the system 100, without concern as to possible timing problems resulting from an unpredictable location of one or more disabled sub-processors 102.

Figure 13:
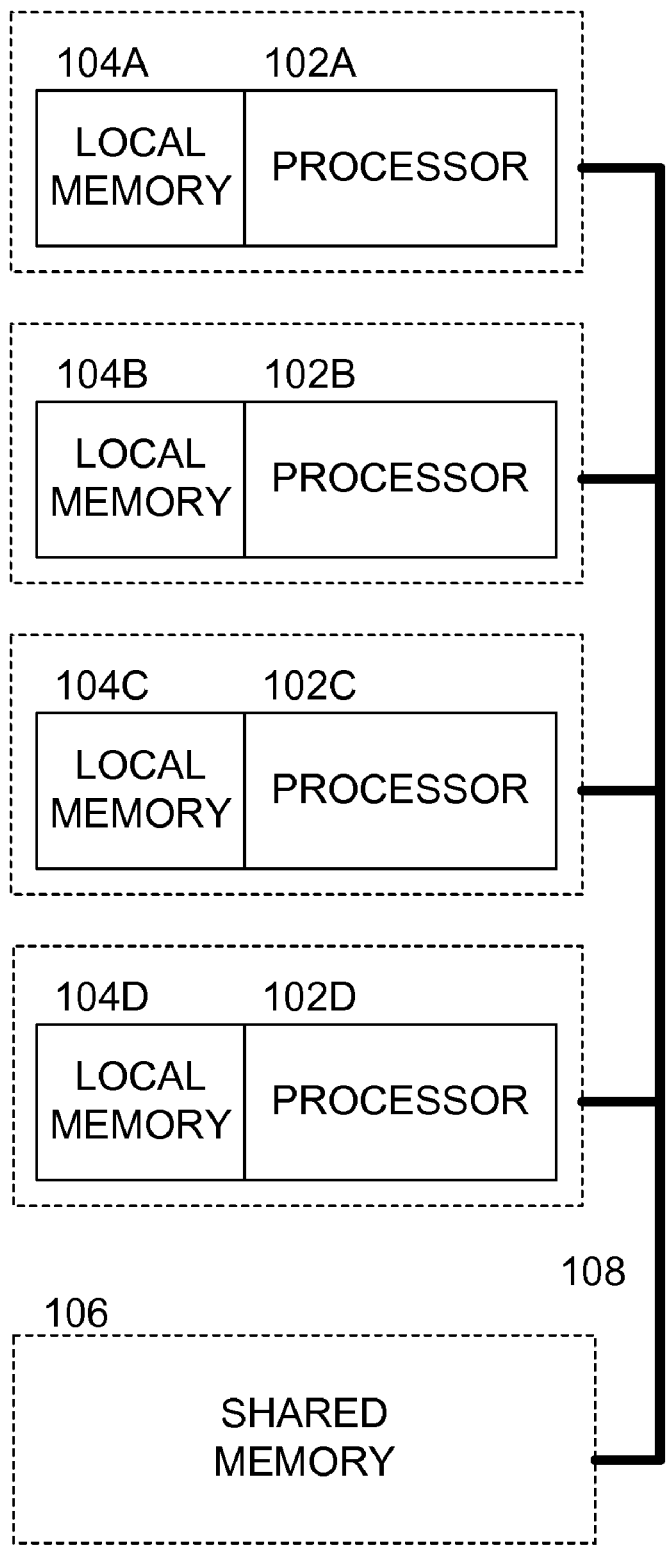
FIG. 13 is a diagram illustrating a multiprocessing system that may be adapted to utilize the latency correction mechanism and functionality discussed above in order to achieve one or more further embodiments of the present invention.

FIG. 13 is a block diagram of a multi-processing system 100A that may be adapted to implement the features discussed herein and one or more further embodiments of the present invention. The system 100A includes a plurality of processors 102A-D, associated local memories 104A-D, and a shared memory 106 interconnected by way of a bus 108. The shared memory 106 may also be referred to herein as a main memory or system memory.

Although four processors 102 are illustrated by way of example, any number may be utilized without departing from the spirit and scope of the present invention. Each of the processors 102 may be of similar construction or of differing construction. The local memories 104 are preferably located on the same chip (same semiconductor substrate) as their respective processors 102; however, the local memories 104 are preferably not traditional hardware cache memories in that there are no on-chip or off-chip hardware cache circuits, cache registers, cache memory controllers, etc. to implement a hardware cache memory function.

The processors 102 preferably provide data access requests to copy data (which may include program data) from the system memory 106 over the bus 108 into their respective local memories 104 for program execution and data manipulation. The mechanism for facilitating data access is preferably implemented utilizing a direct memory access controller (DMAC), not shown. The DMAC of each processor is preferably of substantially the same capabilities as discussed hereinabove with respect to other features of the invention.

The system memory 106 is preferably a dynamic random access memory (DRAM) coupled to the processors 102 through a high bandwidth memory connection (not shown). Although the system memory 106 is preferably a DRAM, the memory 106 may be implemented using other means, e.g., a static random access memory (SRAM), a magnetic random access memory (MRAM), an optical memory, a holographic memory, etc.

Each processor 102 is preferably implemented using a processing pipeline, in which logic instructions are processed in a pipelined fashion. Although the pipeline may be divided into any number of stages at which instructions are processed, the pipeline generally comprises fetching one or more instructions, decoding the instructions, checking for dependencies among the instructions, issuing the instructions, and executing the instructions. In this regard, the processors 102 may include an instruction buffer, instruction decode circuitry, dependency check circuitry, instruction issue circuitry, and execution stages.

In one or more embodiments, the processors 102 and the local memories 104 may be disposed on a common semiconductor substrate. In one or more further embodiments, the shared memory 106 may also be disposed on the common semiconductor substrate or it may be separately disposed.

In one or more alternative embodiments, one or more of the processors 102 may operate as a main processor operatively coupled to the other processors 102 and capable of being coupled to the shared memory 106 over the bus 108. The main processor may schedule and orchestrate the processing of data by the other processors 102. Unlike the other processors 102, however, the main processor may be coupled to a hardware cache memory, which is operable cache data obtained from at least one of the shared memory 106 and one or more of the local memories 104 of the processors 102. The main processor may provide data access requests to copy data (which may include program data) from the system memory 106 over the bus 108 into the cache memory for program execution and data manipulation utilizing any of the known techniques, such as DMA techniques.

A description of a preferred computer architecture for a multi-processor system will now be provided that is suitable for carrying out one or more of the features discussed herein. In accordance with one or more embodiments, the multi-processor system may be implemented as a single-chip solution operable for stand-alone and/or distributed processing of media-rich applications, such as game systems, home terminals, PC systems, server systems and workstations. In some applications, such as game systems and home terminals, real-time computing may be a necessity. For example, in a real-time, distributed gaming application, one or more of networking image decompression, 3D computer graphics, audio generation, network communications, physical simulation, and artificial intelligence processes have to be executed quickly enough to provide the user with the illusion of a real-time experience. Thus, each processor in the multi-processor system must complete tasks in a short and predictable time.

To this end, and in accordance with this computer architecture, all processors of a multi-processing computer system are constructed from a common computing module (or cell). This common computing module has a consistent structure and preferably employs the same instruction set architecture. The multi-processing computer system can be formed of one or more clients, servers, PCs, mobile computers, game machines, PDAs, set top boxes, appliances, digital televisions and other devices using computer processors.

A plurality of the computer systems may also be members of a network if desired. The consistent modular structure enables efficient, high speed processing of applications and data by the multi-processing computer system, and if a network is employed, the rapid transmission of applications and data over the network. This structure also simplifies the building of members of the network of various sizes and processing power and the preparation of applications for processing by these members.

Figure 14:
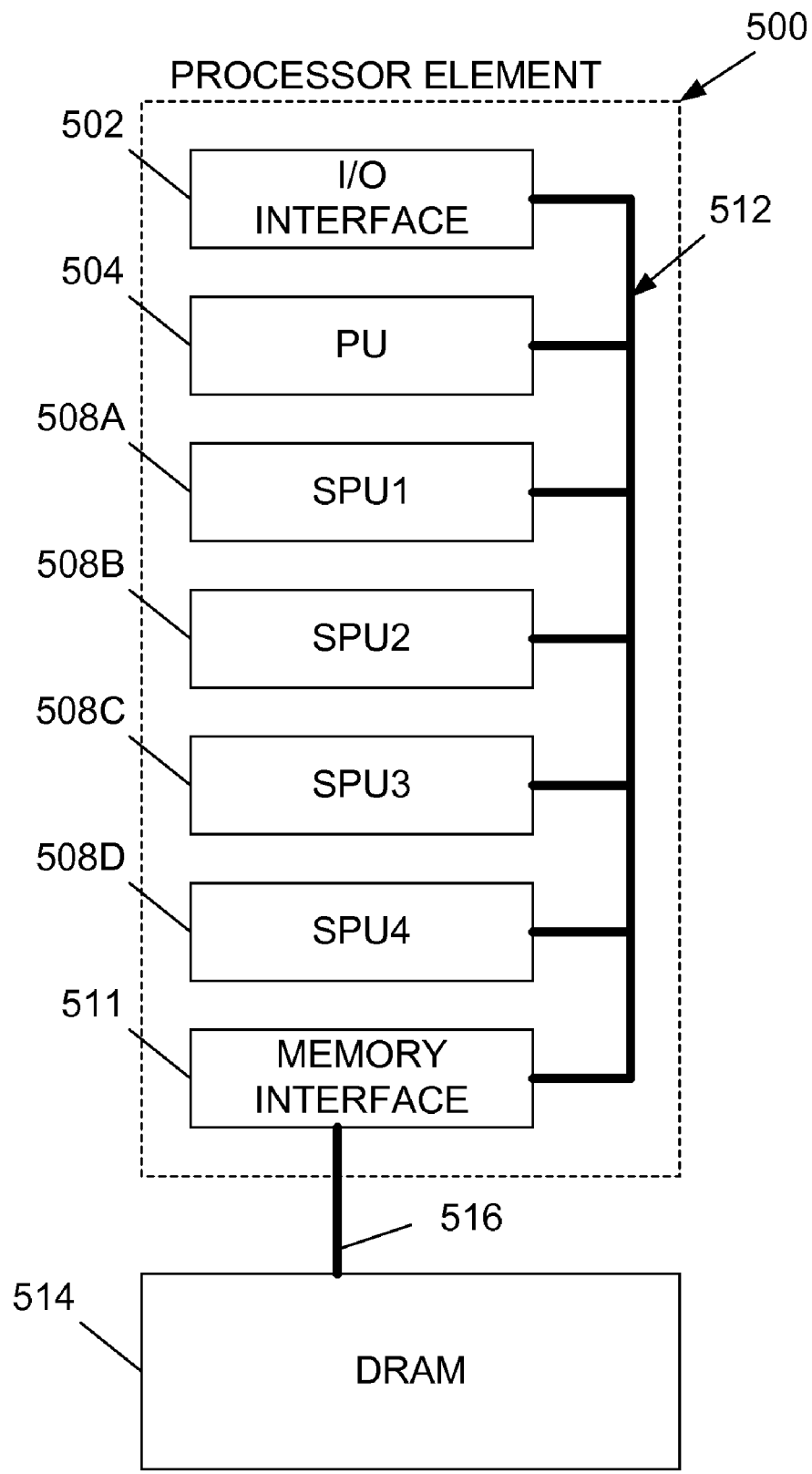
FIG. 14 is a diagram illustrating a processor element (PE) that may be used to implement one or more further aspects of the present invention.

With reference to FIG. 14, the basic processing module is a processor element (PE) 500. The PE 500 comprises an I/O interface 502, a processing unit (PU) 504, and a plurality of sub-processing units 508, namely, sub-processing unit 508A, sub-processing unit 508B, sub-processing unit 508C, and sub-processing unit 508D. A local (or internal) PE bus 512 transmits data and applications among the PU 504, the sub-processing units 508, and a memory interface 511. The local PE bus 512 can have, e.g., a conventional architecture or can be implemented as a packet-switched network. If implemented as a packet switch network, while requiring more hardware, increases the available bandwidth. By way of example, the PE bus 512 may be implemented using a one or more data rings, such as four, 16-byte data rings, which connect all the units together. In one or more embodiments, the rings can be in the same or different directions, such as two rings running clockwise and two rings running counter-clockwise. Each unit attached to the PE bus 512 may have an "on ramp" and an "off ramp".

The PE 500 can be constructed using various methods for implementing digital logic. The PE 500 preferably is constructed, however, as a single integrated circuit employing a complementary metal oxide semiconductor (CMOS) on a silicon substrate. Alternative materials for substrates include gallium arsinide, gallium aluminum arsinide and other so-called III-B compounds employing a wide variety of dopants. The PE 500 also may be implemented using superconducting material, e.g., rapid single-flux-quantum (RSFQ) logic.

The PE 500 is closely associated with a shared (main) memory 514 through a high bandwidth memory connection 516. Although the memory 514 preferably is a dynamic random access memory (DRAM), the memory 514 could be implemented using other means, e.g., as a static random access memory (SRAM), a magnetic random access memory (MRAM), an optical memory, a holographic memory, etc.

The PU 504 and the sub-processing units 508 are preferably each coupled to a memory flow controller (MFC) including direct memory access DMA functionality, which in combination with the memory interface 511, facilitate the transfer of data between the DRAM 514 and the sub-processing units 508 and the PU 504 of the PE 500. It is noted that the DMAC and/or the memory interface 511 may be integrally or separately disposed with respect to the sub-processing units 508 and the PU 504. Indeed, the DMAC function and/or the memory interface 511 function may be integral with one or more (preferably all) of the sub-processing units 508 and the PU 504. It is also noted that the DRAM 514 may be integrally or separately disposed with respect to the PE 500. For example, the DRAM 514 may be disposed off-chip as is implied by the illustration shown or the DRAM 514 may be disposed on-chip in an integrated fashion.

The PU 504 can be, e.g., a standard processor capable of stand-alone processing of data and applications. In operation, the PU 504 preferably schedules and orchestrates the processing of data and applications by the sub-processing units. The sub-processing units preferably are single instruction, multiple data (SIMD) processors. Under the control of the PU 504, the sub-processing units perform the processing of these data and applications in a parallel and independent manner. The PU 504 is preferably implemented using a PowerPC core, which is a microprocessor architecture that employs reduced instruction-set computing (RISC) technique. RISC performs more complex instructions using combinations of simple instructions. Thus, the timing for the processor may be based on simpler and faster operations, enabling the microprocessor to perform more instructions for a given clock speed.

It is noted that the PU 504 may be implemented by one of the sub-processing units 508 taking on the role of a main processing unit that schedules and orchestrates the processing of data and applications by the sub-processing units 508. Further, there may be more than one PU implemented within the processor element 500.

In accordance with this modular structure, the number of PEs 500 employed by a particular computer system is based upon the processing power required by that system. For example, a server may employ four PEs 500, a workstation may employ two PEs 500 and a PDA may employ one PE 500. The number of sub-processing units of a PE 500 assigned to processing a particular software cell depends upon the complexity and magnitude of the programs and data within the cell.

Figure 15:
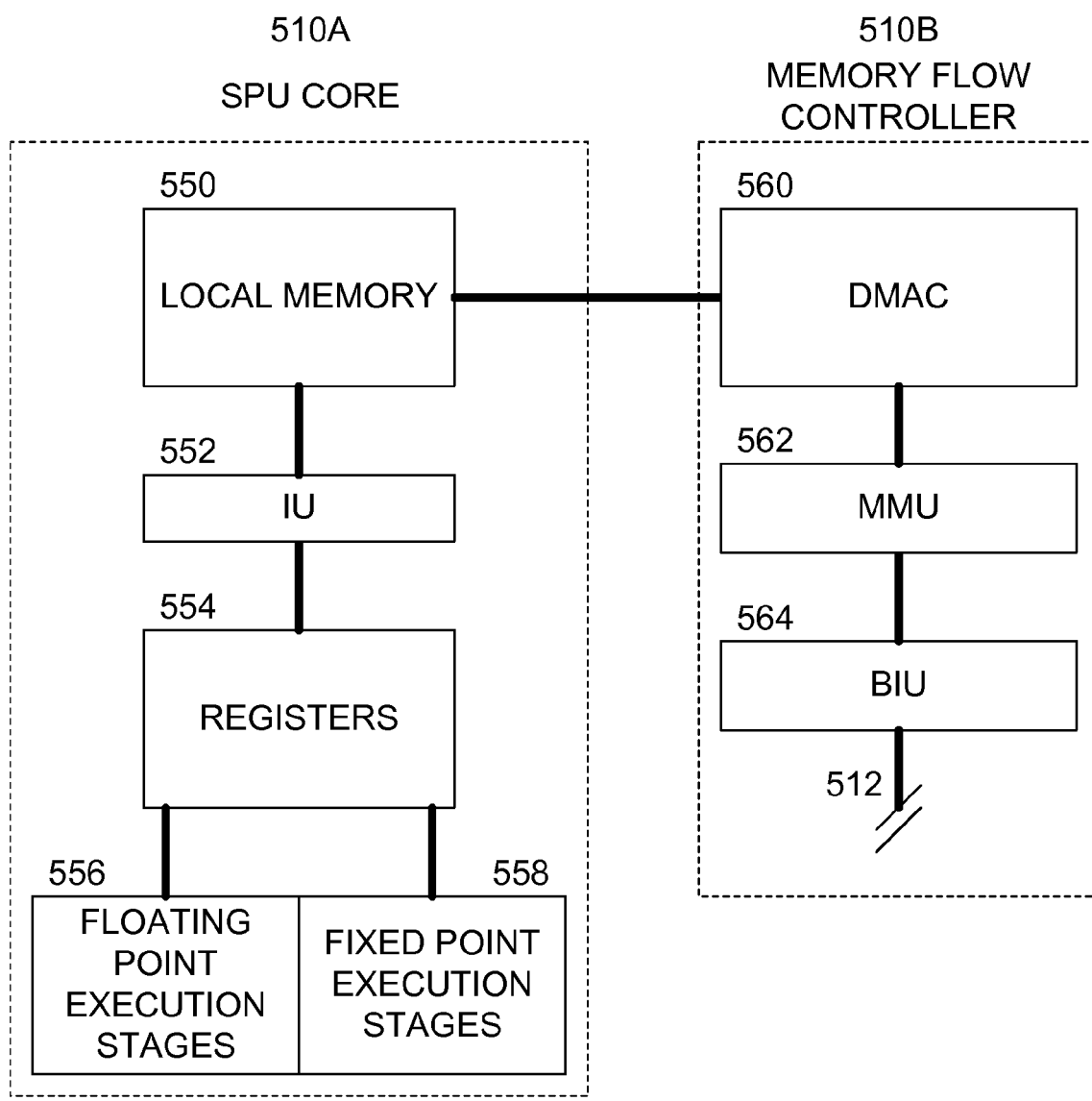
FIG. 15 is a diagram illustrating the structure of an exemplary sub-processing unit (SPU) of the system of FIG. 14 that may be adapted in accordance with one or more further aspects of the present invention.

FIG. 15 illustrates the preferred structure and function of a sub-processing unit (SPU) 508. The SPU 508 architecture preferably fills a void between general-purpose processors (which are designed to achieve high average performance on a broad set of applications) and special-purpose processors (which are designed to achieve high performance on a single application). The SPU 508 is designed to achieve high performance on game applications, media applications, broadband systems, etc., and to provide a high degree of control to programmers of real-time applications. Some capabilities of the SPU 508 include graphics geometry pipelines, surface subdivision, Fast Fourier Transforms, image processing keywords, stream processing, MPEG encoding/decoding, encryption, decryption, device driver extensions, modeling, game physics, content creation, and audio synthesis and processing.

The sub-processing unit 508 includes two basic functional units, namely an SPU core 510A and a memory flow controller (MFC) 510B. The SPU core 510A performs program execution, data manipulation, etc., while the MFC 510B performs functions related to data transfers between the SPU core 510A and the DRAM 514 of the system.

The SPU core 510A includes a local memory 550, an instruction unit (IU) 552, registers 554, one or more floating point execution stages 556 and one or more fixed point execution stages 558. The local memory 550 is preferably implemented using single-ported random access memory, such as an SRAM. Whereas most processors reduce latency to memory by employing caches, the SPU core 510A implements the relatively small local memory 550 rather than a cache. Indeed, in order to provide consistent and predictable memory access latency for programmers of real-time applications (and other applications as mentioned herein) a cache memory architecture within the SPU 508A is not preferred. The cache hit/miss characteristics of a cache memory results in volatile memory access times, varying from a few cycles to a few hundred cycles. Such volatility undercuts the access timing predictability that is desirable in, for example, real-time application programming. Latency hiding may be achieved in the local memory SRAM 550 by overlapping DMA transfers with data computation. This provides a high degree of control for the programming of real-time applications. As the latency and instruction overhead associated with DMA transfers exceeds that of the latency of servicing a cache miss, the SRAM local memory approach achieves an advantage when the DMA transfer size is sufficiently large and is sufficiently predictable (e.g., a DMA command can be issued before data is needed).

A program running on a given one of the sub-processing units 508 references the associated local memory 550 using a local address, however, each location of the local memory 550 is also assigned a real address (RA) within the overall system's memory map. This allows Privilege Software to map a local memory 550 into the Effective Address (EA) of a process to facilitate DMA transfers between one local memory 550 and another local memory 550. The PU 504 can also directly access the local memory 550 using an effective address. In a preferred embodiment, the local memory 550 contains 556 kilobytes of storage, and the capacity of registers 552 is 128×128 bits.

The SPU core 504A is preferably implemented using a processing pipeline, in which logic instructions are processed in a pipelined fashion. Although the pipeline may be divided into any number of stages at which instructions are processed, the pipeline generally comprises fetching one or more instructions, decoding the instructions, checking for dependencies among the instructions, issuing the instructions, and executing the instructions. In this regard, the IU 552 includes an instruction buffer, instruction decode circuitry, dependency check circuitry, and instruction issue circuitry.

The instruction buffer preferably includes a plurality of registers that are coupled to the local memory 550 and operable to temporarily store instructions as they are fetched. The instruction buffer preferably operates such that all the instructions leave the registers as a group, i.e., substantially simultaneously. Although the instruction buffer may be of any size, it is preferred that it is of a size not larger than about two or three registers.

In general, the decode circuitry breaks down the instructions and generates logical micro-operations that perform the function of the corresponding instruction. For example, the logical micro-operations may specify arithmetic and logical operations, load and store operations to the local memory 550, register source operands and/or immediate data operands. The decode circuitry may also indicate which resources the instruction uses, such as target register addresses, structural resources, function units and/or busses. The decode circuitry may also supply information indicating the instruction pipeline stages in which the resources are required. The instruction decode circuitry is preferably operable to substantially simultaneously decode a number of instructions equal to the number of registers of the instruction buffer.

The dependency check circuitry includes digital logic that performs testing to determine whether the operands of given instruction are dependent on the operands of other instructions in the pipeline. If so, then the given instruction should not be executed until such other operands are updated (e.g., by permitting the other instructions to complete execution). It is preferred that the dependency check circuitry determines dependencies of multiple instructions dispatched from the decoder circuitry 112 simultaneously.

The instruction issue circuitry is operable to issue the instructions to the floating point execution stages 556 and/or the fixed point execution stages 558.

The registers 554 are preferably implemented as a relatively large unified register file, such as a 128-entry register file. This allows for deeply pipelined high-frequency implementations without requiring register renaming to avoid register starvation. Renaming hardware typically consumes a significant fraction of the area and power in a processing system. Consequently, advantageous operation may be achieved when latencies are covered by software loop unrolling or other interleaving techniques.

Preferably, the SPU core 510A is of a superscalar architecture, such that more than one instruction is issued per clock cycle. The SPU core 510A preferably operates as a superscalar to a degree corresponding to the number of simultaneous instruction dispatches from the instruction buffer, such as between 2 and 3 (meaning that two or three instructions are issued each clock cycle). Depending upon the required processing power, a greater or lesser number of floating point execution stages 556 and fixed point execution stages 558 may be employed. In a preferred embodiment, the floating point execution stages 556 operate at a speed of 32 billion floating point operations per second (32 GFLOPS), and the fixed point execution stages 558 operate at a speed of 32 billion operations per second (32 GOPS).

The MFC 510B preferably includes a bus interface unit (BIU) 564, a memory management unit (MMU) 562, and a direct memory access controller (DMAC) 560. With the exception of the DMAC 560, the MFC 510B preferably runs at half frequency (half speed) as compared with the SPU core 510A and the bus 512 to meet low power dissipation design objectives. The MFC 510B is operable to handle data and instructions coming into the SPU 508 from the bus 512, provides address translation for the DMAC, and snoop-operations for data coherency. The BIU 564 provides an interface between the bus 512 and the MMU 562 and DMAC 560. Thus, the SPU 508 (including the SPU core 510A and the MFC 510B) and the DMAC 560 are connected physically and/or logically to the bus 512.

The MMU 562 is preferably operable to translate effective addresses (taken from DMA commands) into real addresses for memory access. For example, the MMU 562 may translate the higher order bits of the effective address into real address bits. The lower-order address bits, however, are preferably untranslatable and are considered both logical and physical for use to form the real address and request access to memory. In one or more embodiments, the MMU 562 may be implemented based on a 64-bit memory management model, and may provide $2^{64}$ bytes of effective address space with 4K-, 64K-, 1M-, and 16M-byte page sizes and 256 MB segment sizes. Preferably, the MMU 562 is operable to support up to 265 bytes of virtual memory, and $2^{42}$ bytes (4 TeraBytes) of physical memory for DMA commands. The hardware of the MMU 562 may include an 8-entry, fully associative SLB, a 256-entry, 4way set associative TLB, and a 4×4 Replacement Management Table (RMT) for the TLB—used for hardware TLB miss handling.

The DMAC 560 is preferably operable to manage DMA commands from the SPU core 510A and one or more other devices such as the PU 504 and/or the other SPUs. There may be three categories of DMA commands: Put commands, which operate to move data from the local memory 550 to the shared memory 514; Get commands, which operate to move data into the local memory 550 from the shared memory 514; and Storage Control commands, which include SLI commands and synchronization commands. The synchronization commands may include atomic commands, send signal commands, and dedicated barrier commands. In response to DMA commands, the MMU 562 translates the effective address into a real address and the real address is forwarded to the BIU 564.

The SPU core 510A preferably uses a channel interface and data interface to communicate (send DMA commands, status, etc.) with an interface within the DMAC 560. The SPU core 510A dispatches DMA commands through the channel interface to a DMA queue in the DMAC 560. Once a DMA command is in the DMA queue, it is handled by issue and completion logic within the DMAC 560. When all bus transactions for a DMA command are finished, a completion signal is sent back to the SPU core 510A over the channel interface.

Figure 16:
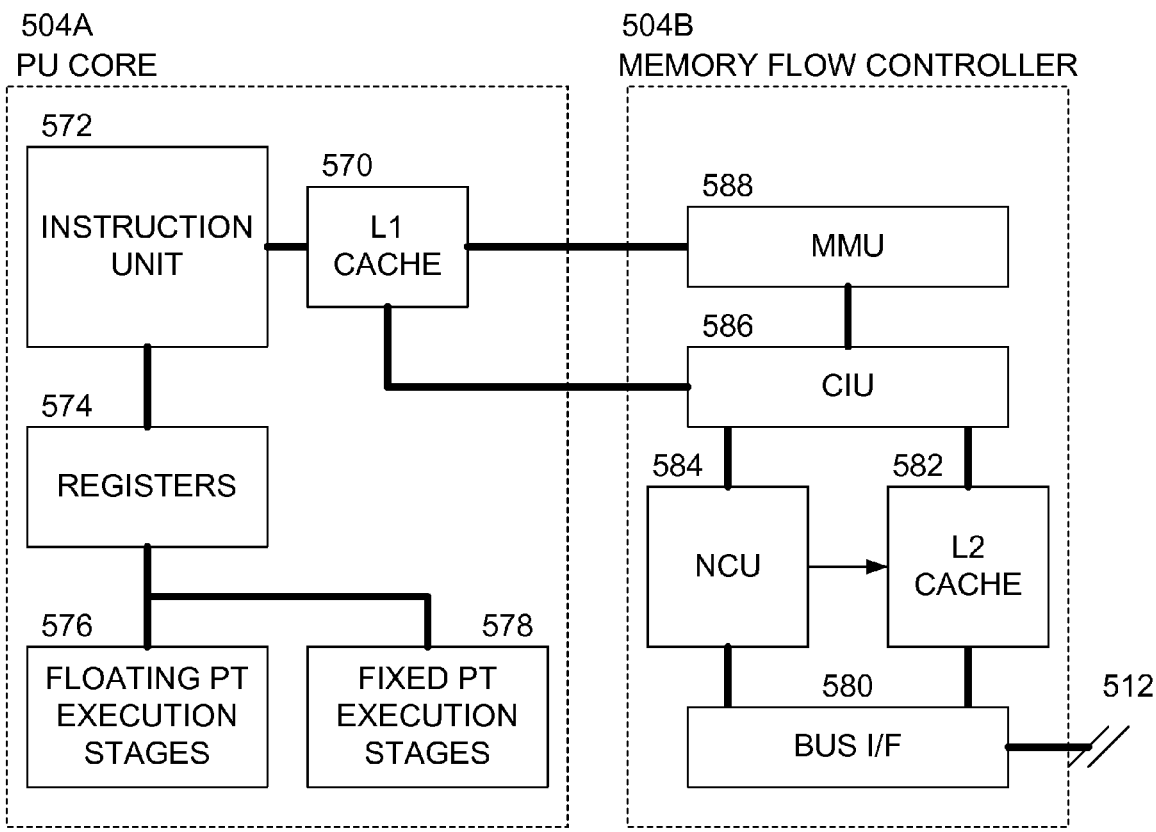
FIG. 16 is a diagram illustrating the structure of an exemplary processing unit (PU) of the system of FIG. 14 that may be adapted in accordance with one or more further aspects of the present invention.

FIG. 16 illustrates the preferred structure and function of the PU 504. The PU 504 includes two basic functional units, the PU core 504A and the memory flow controller (MFC) 504B. The PU core 504A performs program execution, data manipulation, multi-processor management functions, etc., while the MFC 504B performs functions related to data transfers between the PU core 504A and the memory space of the system 100.

The PU core 504A may include an L1 cache 570, an instruction unit 572, registers 574, one or more floating point execution stages 576 and one or more fixed point execution stages 578. The L1 cache provides data caching functionality for data received from the shared memory 106, the processors 102, or other portions of the memory space through the MFC 504B. As the PU core 504A is preferably implemented as a superpipeline, the instruction unit 572 is preferably implemented as an instruction pipeline with many stages, including fetching, decoding, dependency checking, issuing, etc. The PU core 504A is also preferably of a superscalar configuration, whereby more than one instruction is issued from the instruction unit 572 per clock cycle. To achieve a high processing power, the floating point execution stages 576 and the fixed point execution stages 578 include a plurality of stages in a pipeline configuration. Depending upon the required processing power, a greater or lesser number of floating point execution stages 576 and fixed point execution stages 578 may be employed.

The MFC 504B includes a bus interface unit (BIU) 580, an L2 cache memory, a non-cachable unit (NCU) 584, a core interface unit (CIU) 586, and a memory management unit (MMU) 588. Most of the MFC 504B runs at half frequency (half speed) as compared with the PU core 504A and the bus 108 to meet low power dissipation design objectives.

The BIU 580 provides an interface between the bus 108 and the L2 cache 582 and NCU 584 logic blocks. To this end, the BIU 580 may act as a Master as well as a Slave device on the bus 108 in order to perform fully coherent memory operations. As a Master device it may source load/store requests to the bus 108 for service on behalf of the L2 cache 582 and the NCU 584. The BIU 580 may also implement a flow control mechanism for commands which limits the total number of commands that can be sent to the bus 108. The data operations on the bus 108 may be designed to take eight beats and, therefore, the BIU 580 is preferably designed around 128 byte cache-lines and the coherency and synchronization granularity is 128 KB.

The L2 cache memory 582 (and supporting hardware logic) is preferably designed to cache 512 KB of data. For example, the L2 cache 582 may handle cacheable loads/stores, data pre-fetches, instruction fetches, instruction pre-fetches, cache operations, and barrier operations. The L2 cache 582 is preferably an 8-way set associative system. The L2 cache 582 may include six reload queues matching six (6) castout queues (e.g., six RC machines), and eight (64-byte wide) store queues. The L2 cache 582 may operate to provide a backup copy of some or all of the data in the L1 cache 570. Advantageously, this is useful in restoring state(s) when processing nodes are hot-swapped. This configuration also permits the L1 cache 570 to operate more quickly with fewer ports, and permits faster cache-to-cache transfers (because the requests may stop at the L2 cache 582). This configuration also provides a mechanism for passing cache coherency management to the L2 cache memory 582.

The NCU 584 interfaces with the CIU 586, the L2 cache memory 582, and the BIU 580 and generally functions as a queueing/buffering circuit for non-cacheable operations between the PU core 504A and the memory system. The NCU 584 preferably handles all communications with the PU core 504A that are not handled by the L2 cache 582, such as cache-inhibited load/stores, barrier operations, and cache coherency operations. The NCU 584 is preferably run at half speed to meet the aforementioned power dissipation objectives.

The CIU 586 is disposed on the boundary of the MFC 504B and the PU core 504A and acts as a routing, arbitration, and flow control point for requests coming from the execution stages 576, 578, the instruction unit 572, and the MMU unit 588 and going to the L2 cache 582 and the NCU 584. The PU core 504A and the MMU 588 preferably run at full speed, while the L2 cache 582 and the NCU 584 are operable for a 2:1 speed ratio. Thus, a frequency boundary exists in the CIU 586 and one of its functions is to properly handle the frequency crossing as it forwards requests and reloads data between the two frequency domains.

The CIU 586 is comprised of three functional blocks: a load unit, a store unit, and reload unit. In addition, a data pre-fetch function is performed by the CIU 586 and is preferably a functional part of the load unit. The CIU 586 is preferably operable to: (i) accept load and store requests from the PU core 504A and the MMU 588; (ii) convert the requests from full speed clock frequency to half speed (a 2:1 clock frequency conversion); (iii) route cachable requests to the L2 cache 582, and route non-cachable requests to the NCU 584; (iv) arbitrate fairly between the requests to the L2 cache 582 and the NCU 584; (v) provide flow control over the dispatch to the L2 cache 582 and the NCU 584 so that the requests are received in a target window and overflow is avoided; (vi) accept load return data and route it to the execution stages 576, 578, the instruction unit 572, or the MMU 588; (vii) pass snoop requests to the execution stages 576, 578, the instruction unit 572, or the MMU 588; and (viii) convert load return data and snoop traffic from half speed to full speed.

The MMU 588 preferably provides address translation for the PU core 540A, such as by way of a second level address translation facility. A first level of translation is preferably provided in the PU core 504A by separate instruction and data ERAT (effective to real address translation) arrays that may be much smaller and faster than the MMU 588.

In a preferred embodiment, the PU 504 operates at 4-6 GHz, 10F04, with a 64-bit implementation. The registers are preferably 64 bits long (although one or more special purpose registers may be smaller) and effective addresses are 64 bits long. The instruction unit 570, registers 572 and execution stages 574 and 576 are preferably implemented using PowerPC technology to achieve the (RISC) computing technique.

Additional details regarding the modular structure of this computer system may be found in U.S. Pat. No. 6,526,491, the entire disclosure of which is hereby incorporated by reference.

In accordance with at least one further aspect of the present invention, the methods and apparatus described above may be achieved utilizing suitable hardware, such as that illustrated in the figures. Such hardware may be implemented utilizing any of the known technologies, such as standard digital circuitry, any of the known processors that are operable to execute software and/or firmware programs, one or more programmable digital devices or systems, such as programmable read only memories (PROMs), programmable array logic devices (PALs), etc. Furthermore, although the apparatus illustrated in the figures are shown as being partitioned into certain functional blocks, such blocks may be implemented by way of separate circuitry and/or combined into one or more functional units. Still further, the various aspects of the invention may be implemented by way of software and/or firmware program(s) that may be stored on suitable storage medium or media (such as floppy disk(s), memory chip(s), etc.) for transportability and/or distribution.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A multiprocessor system, comprising: a plurality of sub-processors operatively coupled to one another over a ring bus, whereby data may be transmitted over one or more paths on the ring bus between pairs of the sub-processors; and a plurality of programmable delay circuits, each associated with at least one of the sub-processors, and each being operable to alter a delay of data transfer at least one of into and out of its associated sub-processor in order to alter one or more latencies associated with the paths on the ring bus between pairs of the sub-processors, wherein each delay circuit alters the delay into or out of its associated sub-processor such that a pattern of latencies between pairs of sub-processors is the same irrespective of a location of a disabled sub-processor.

2. The multiprocessor system of claim 1, wherein the delays of the delay circuits define a delay pattern.

3. The multiprocessor system of claim 2, wherein the delay pattern is different depending on the location of the disabled sub-processor.

4. The multiprocessor system of claim 1, wherein the ring bus includes at least one path segment between each pair of sub-processors, and each path segment exhibits a latency associated with the transmittal of data thereover.

5. The multiprocessor system of claim 4, wherein each of the latencies associated with the paths on the ring bus between pairs of the sub-processors is defined by respective aggregates of one or more of the latencies associated with the at least one path segment.

6. The multiprocessor system of claim 1, wherein the ring bus is bi-directional such that the paths run clockwise and counterclockwise.

7. A method, comprising: providing a plurality of sub-processors operatively coupled to one another over a ring bus, whereby data may be transmitted over one or more paths on the ring bus between pairs of the sub-processors; and altering a delay of data transfer at least one of into and out of one or more of the sub-processors in order to alter one or more latencies associated with the paths on the ring bus between pairs of the sub-processors, wherein altering the delays are such that a pattern of latencies between pairs of sub-processors is the same irrespective of a location of a disabled sub-processor.

8. The method of claim 7, wherein the delays of the delay circuits define a delay pattern.

9. The method of claim 8, wherein the delay pattern is different depending on the location of the disabled sub-processor.

10. A method, comprising: defining a first pattern of latencies between respective pairs of enabled sub-processors coupled together over a ring bus including latencies past at least one disabled sub-processor in a first position on the ring bus; defining a second pattern of latencies between respective pairs of enabled sub-processors coupled together over the ring bus including latencies past the at least one disabled sub-processor in a second position on the ring bus; defining at least one further pattern of latencies for at least one further location of the at least one disabled sub-processor; and determining a respective delay pattern for each of the patterns of latencies, whereby each delay pattern represents adding delays in data transfer at least one of into and out of one or more of the sub-processors such that the delay pattern facilitates an altered pattern of latencies between pairs of sub-processors and wherein the altered pattern of latencies is the same irrespective of the location of the at least one disabled sub-processor.

11. The method of claim 10, wherein the steps of defining the patterns of latencies between respective pairs of enabled sub-processors includes aggregating latencies of respective path segments between adjacent sub-processors disposed between the respective pairs of sub-processors.

12. The method of claim 10, further comprising defining the patterns of latencies in one or more clockwise directions about the ring bus.

13. The method of claim 10, further comprising defining the patterns of latencies in one or more counterclockwise directions about the ring bus.

14. The method of claim 10, further comprising determining a maximum latency between a pair of sub-processors with N enabled sub-processors therebetween.

15. The method of claim 14, further comprising: comparing the maximum latency with the determined latencies between other pairs of sub-processors with N enabled sub-processors therebetween; and computing a portion of the delay pattern such that adding delays in data transfer at least one of into and out of at least some of the other pairs of sub-processors with N enabled sub-processors therebetween would result in latencies between such pairs of sub-processors substantially equal to the maximum latency.

16. The method of claim 15, further comprising performing the comparing and computing steps for an integer number of N times, where $N=0, 1, \ldots M-1$, where M is a total number of enabled sub-processors.

17. The method of claim 15, further comprising performing the comparing and computing steps for at least one of clockwise directions about the ring bus, and counterclockwise directions about the ring bus.

18. The method of claim 17, wherein the step of determining a respective delay pattern includes: determining a respective delay pattern for each of the patterns of latencies in the clockwise and counterclockwise directions about the ring bus.

* * * * *